United States Patent [19]
Kriska et al.

[11] Patent Number: 5,494,314
[45] Date of Patent: Feb. 27, 1996

[54] AIR BAG CUSHION WITH FABRIC DIFFUSER

[75] Inventors: Thomas M. Kriska, Kaysville; Mark L. Garcia, Logan, both of Utah

[73] Assignee: Morton International, Inc., Chicago, Ill.

[21] Appl. No.: 361,022

[22] Filed: Dec. 21, 1994

Related U.S. Application Data

[63] Continuation of Ser. No. 984,050, Dec. 1, 1992, abandoned.

[51] Int. Cl.⁶ ................................. B60R 21/26
[52] U.S. Cl. ......................... 280/740; 280/743.1
[58] Field of Search ..................... 280/729, 740, 280/743 R, 742, 728 R, 732, 736, 741, 728 A, 730 R, 743 A, 743.1, 742, 728.1, 728.2, 730.1, 743.2

[56] References Cited

U.S. PATENT DOCUMENTS

| | | | |
|---|---|---|---|
| 3,473,824 | 10/1969 | Carey et al. | 280/729 |
| 3,614,127 | 10/1971 | Glance | 280/729 |
| 3,618,981 | 11/1971 | Leising et al. | 280/740 |
| 3,756,621 | 9/1973 | Lewis et al. | 280/741 |
| 3,797,855 | 3/1974 | Wright, Jr. | 280/743 A |
| 3,799,575 | 3/1974 | Kurze et al. | 280/743 R |
| 3,836,169 | 9/1974 | Schiesterl | 280/740 |
| 4,865,635 | 9/1989 | Cuevas | 55/276 |
| 4,907,819 | 3/1990 | Cuevas | 280/736 |
| 4,923,212 | 5/1990 | Cuevas | 280/736 |
| 4,964,654 | 10/1990 | Bishop et al. | 280/743 R |
| 5,018,762 | 5/1991 | Suzuki et al. | 280/731 |
| 5,031,932 | 7/1991 | Frantom et al. | 280/741 |
| 5,160,164 | 11/1992 | Fischer et al. | 280/732 |

FOREIGN PATENT DOCUMENTS

| | | | |
|---|---|---|---|
| 0422840 | 4/1991 | European Pat. Off. | 280/728 R |
| 2111898 | 3/1971 | Germany . | |
| 0070648 | 3/1991 | Japan | 280/728 A |
| 3281460 | 12/1991 | Japan | 280/729 |
| 1151774 | 5/1969 | United Kingdom . | |
| 2265118 | 9/1993 | United Kingdom . | |
| WO9311972 | 6/1993 | WIPO . | |

*Primary Examiner*—Margaret A. Focarino
*Assistant Examiner*—Peter C. English
*Attorney, Agent, or Firm*—Charles N. Lovell; Gerald K. White

[57] ABSTRACT

A device is provided for controlling the forward momentum of the front surface of an automotive air bag cushion during deployment thereof. A diffuser is installed inside the air bag cushion near the gets inlet and substantially perpendicular to the flow of gas from the inflator. The diffuser results in reduced forward momentum of the front part of the air bag cushion thus permitting the lower portion of the air bag cushion to deploy toward the occupant of the vehicle so that initial contact of the air bag is made with the lower torso of an occupant. The cushion is thereby moved into a lower position in front of the occupant's torso more quickly than an air bag cushion equipped without a diffuser. The diffuser of this invention also provides secondary filtration of particulate matter from the gas stream.

7 Claims, 4 Drawing Sheets

AIR BAG CUSHION WITH FABRIC DIFFUSER

This application is a continuation of application Ser. No. 07/984,050, filed Dec. 1, 1992, abandoned.

BACKGROUND OF THE INVENTION

1. Field of the Invention

This invention relates to a means for controlling the deployment of a vehicle air bag cushion, and more particularly, to a diffusion panel mounted inside the air bag cushion near the gas inlet opening for controlling and redirecting the flow of incoming gas from an inflator.

2. Description of the Related Art

An air bag restraint system module typically includes; an open-sided canister that encloses an inflator and at least part of an air bag cushion, said canister having a cover which conceals the module from view. When an air bag module is designed for the driver side of a vehicle, the module is located in the steering wheel behind a cosmetic cover which is an integral part of the steering wheel design. When the air bag module is designed for the passenger side of a vehicle, the container may be located just behind the vehicle dashboard, cosmetic cover, or passenger side instrument panel (hereinafter referred to as "dashboard") and the cover may form an integral part of the vehicle dashboard.

When the vehicle is involved in a collision, a crash signal initiates operation of the inflator to cause the air bag cushion to deploy. The inflator produces an inert gas (e.g., nitrogen or argon) and particulate matter. Filters within the inflator remove most of the particulate matter; however, a small amount of particulate may pass through the filter and enter the air bag cushion. Gas from the inflator is directed under pressure, into the air bag cushion. The air bag continues to inflate until sufficient pressure has developed to rupture the tearseams in the steering wheel cover or dashboard, or to move the hinged cover of the dashboard. The air bag cushion then expands rapidly deploying out of the container and through the opening provided in the steering wheel cover or dashboard and into the occupant compartment of the vehicle. As the air bag cushion is directed into the occupant compartment, it is inflated by the continued flow of gas produced by the inflator. Gas from the inflator normally enters the cushion to produce uniform inflation across the air bag cushion. However, due to certain inflator designs resulting in nonuniform flow of gas across the gas inlet opening, one side of the air bag cushion may fill more quickly than the other. Also, a small amount of particulate matter may be transported into the air bag cushion and may pass out of the air bag cushion into the occupant compartment.

A driver side air bag cushion that does not have any internal or external deployment control mechanism, such as a tether deploys rapidly to fill the space between the steering wheel and the driver's head and upper torso. On the passenger side the air bag cushion, which is absent any deployment control mechanism, is directed to rapidly fill the space between the windshield and the occupant's head and upper torso.

During the early stages of the air bag cushion's deployment, it is desirable to slow the forward movement of the air bag toward the occupant and instead expand the air bag cushion between the steering wheel or dashboard of the vehicle and the occupant's torso in order that the momentum of the moving occupant can be initially absorbed from the occupant's lower torso. After the initial contact the air bag cushion continues to provide protection for a short time to the head and upper body of the occupant during a collision. Also, it is desirable to compensate for nonuniform flow of gas from the inflator in order that the air bag cushion inflate evenly across the cushion. Further, it is desirable to provide a secondary means for filtering out particulate matter present in the gas stream.

Wright Jr., U.S. Pat. No. 3,797,855, discloses a bag within a bag for use as a cushion for an automotive air bag. Wright also discloses a pleat system for the gradual deployment of the air bag cushion to reduce the level of noise generated by the air bag cushion. The inner bag has a number of vent holes to permit communication of gas provided by an inflator from the inner bag to the outer bag. Suzuki et al., U.S. Pat. No. 5,018,762, discloses a driver side air bag with an inclined partition having a number of openings for restricting the flow of generated gas to the upper portion of the air bag thereby increasing gas flow to the lower regions of the air bag. Glance, U.S. Pat. No. 3,614,127, discloses a multi-chamber air bag wherein each chamber is separated from the other chambers except for an orifice which permits communication of gas from one chamber to the next. The size of each orifice varies inversely with the distance of the orifice from the source of pressurized gas. These disclosures do not disclose an efficient means for reducing the forward momentum of the air bag cushion. Further, these disclosures do not disclose a method or apparatus for the secondary filtration of the gas generated by the inflator.

SUMMARY OF THE INVENTION

An object of this invention is to provide a means to reduce the forward thrust of gas entering the bag cushion, thereby slowing the forward momentum of the air bag cushion. This permits the lower portion of the air bag to inflate into place between the occupant's lower torso and the steering wheel or the instrument panel, such that the initial contact is made between the air bag cushion and the occupant's lower torso.

Another object of this invention is to provide a uniform flow of gas across the gas inlet opening of the air bag cushion from an inflator which produces a nonuniform flow of gas across the gas inlet opening of the air bag cushion.

Another object of this invention is to provide a means for controlling the deployment angle of the air bag cushion.

Another object of this invention is to provide a means of secondary filtration to reduce the amount of particulate matter present in the gas which inflates the air bag cushion.

These and other objectives of the invention, which will become apparent from the following description, have been achieved by a novel device for use with automotive air bag cushions comprising, a diffuser attached to the inside of an air bag cushion at a number of points. The diffuser is attached to the air bag a short distance from the gas inlet opening of the air bag cushion and substantially perpendicular to the direction of the flow of gas from the inflator entering through the gas inlet opening of the air bag cushion.

The diffuser of this invention is for use with an automotive air bag cushion. The air bag cushion includes a first portion, which is disposed opposite an occupant of the vehicle when the air bag cushion is fully deployed, a second portion forming the side walls of the cushion and attached to the first portion, and terminating in a third portion which defines a gas inlet opening for receiving a flow of gas from an inflator. The first and the second portions of the air bag define an enclosed volume.

The diffuser is a flexible panel attached to the inside of the air bag cushion to permit the flow of gas entering through the inlet to pass around the edges of the diffuser. In addition, a number of apertures passing through the diffuser may be provided to allow gas to flow through the diffuser. The diffuser is attached to the second portion of the air bag cushion in such a way that the plane of attachment of the diffuser is substantially perpendicular to the flow of gas entering through the inlet opening. The diffuser spans the gas inlet opening such that the flow of gas from the inflator impacts upon the diffuser. Gas entering the air bag cushion is redirected around the diffuser and then passes through openings between the edge of the diffuser and the inside of the second portion of the air bag cushion. Also, gas can be directed to certain sections of the air bag cushion by apertures in the diffuser. The diffuser produces a significant change in the direction of the flow of gas into the air bag cushion.

The diffuser is attached to the inside of the air bag cushion second portion at a plurality of points, spanning across the volume defined by the first and the second portions of the air bag cushion. The diffuser can be attached to the top of the air bag cushion and to the bottom of the air bag cushion or from one side of the cushion to the other side. The diffuser can be attached so that opposite edges of the diffuser are attached over their entire length, thus forcing gas from around the unattached edges and through the optional apertures. The diffuser may be attached along three edges. However, at least one edge of the diffuser must remain unattached to the air bag cushion to permit a large volume of gas to flow quickly into the air bag cushion to inflate the cushion.

BRIEF DESCRIPTION OF THE DRAWINGS

A detailed description of this invention follows with reference being made to the accompanying figures of drawings which form an integral part of the specification, in which like parts are designated by the same reference numbers, and of which.

DETAILED DESCRIPTION OF THE INVENTION

Figure 1:
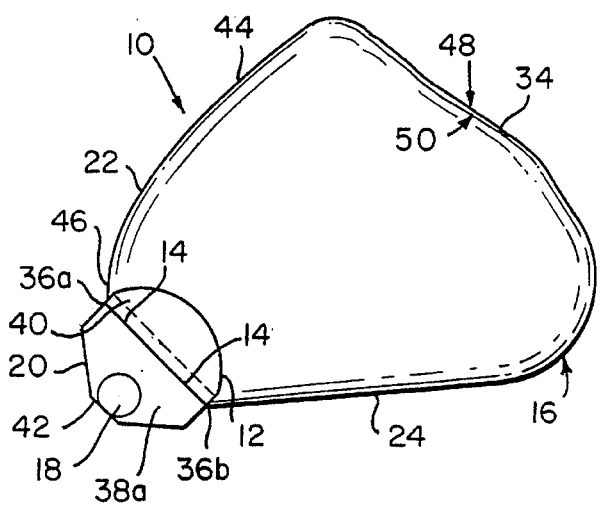
FIG. 1 is a side plan view illustrating the invention relative to the air bag cushion.
Figure 3:
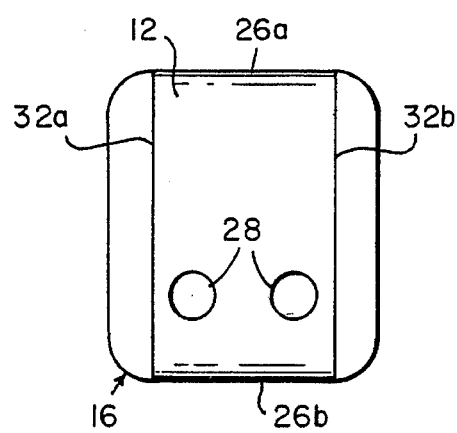
FIG. 3 is a fragmented front plan view of the air bag cover illustrating the attachment the diffuser.
Figure 2:
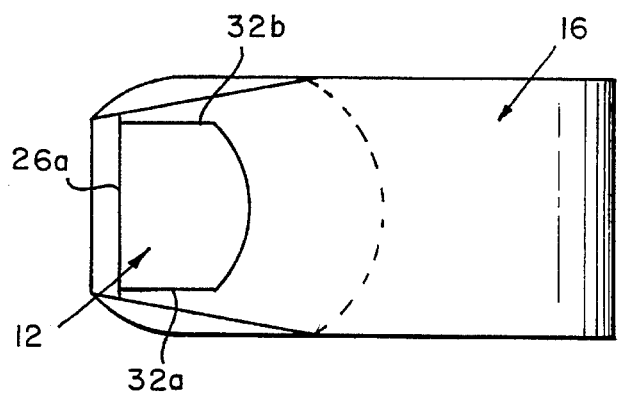
FIG. 2 is a fragmented top plan view illustrating the invention relative to the air bag cushion.
Figure 5:
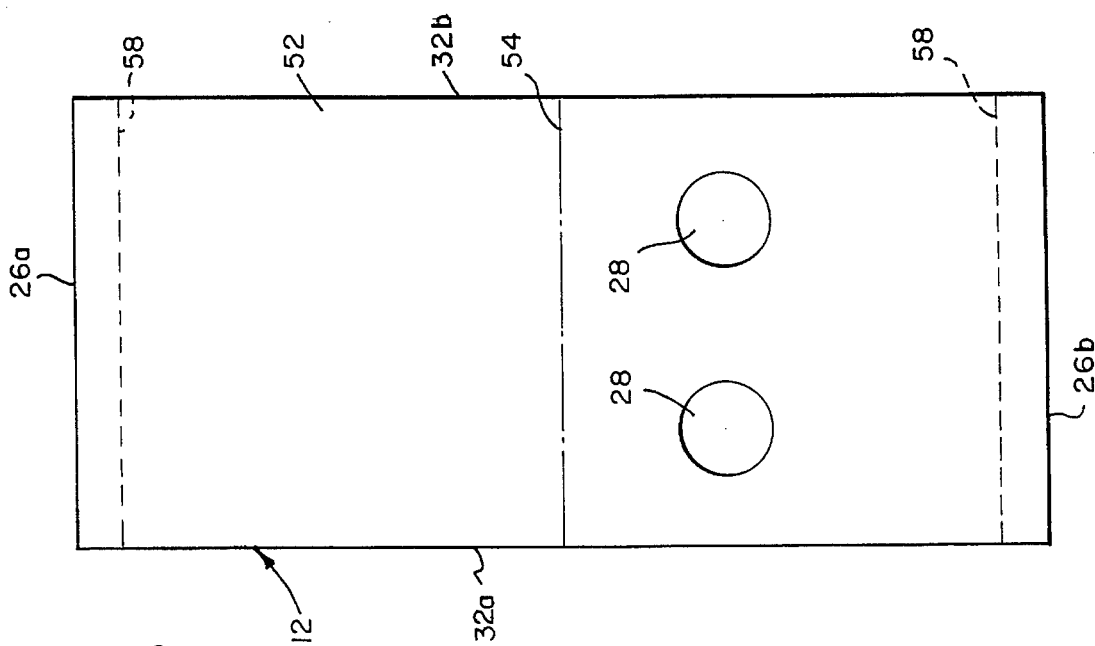
FIG. 5 is a top view of a diffuser.
Figure 6:
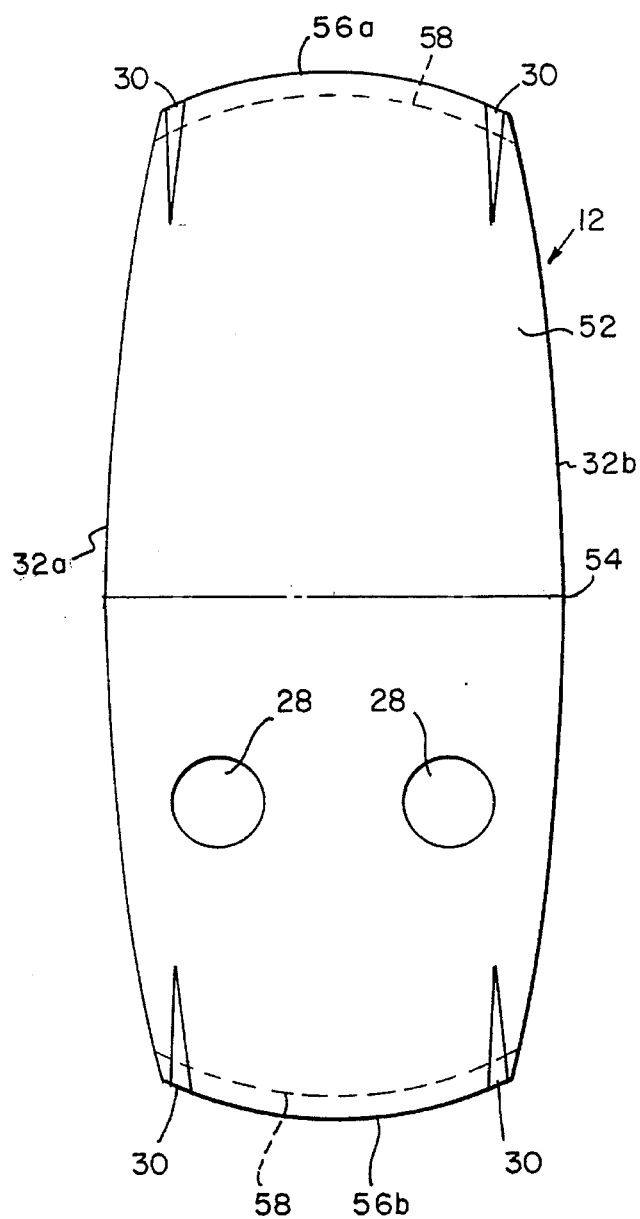
FIG. 6 is a top view of a second possible shape for the diffuser.
Figure 6A:
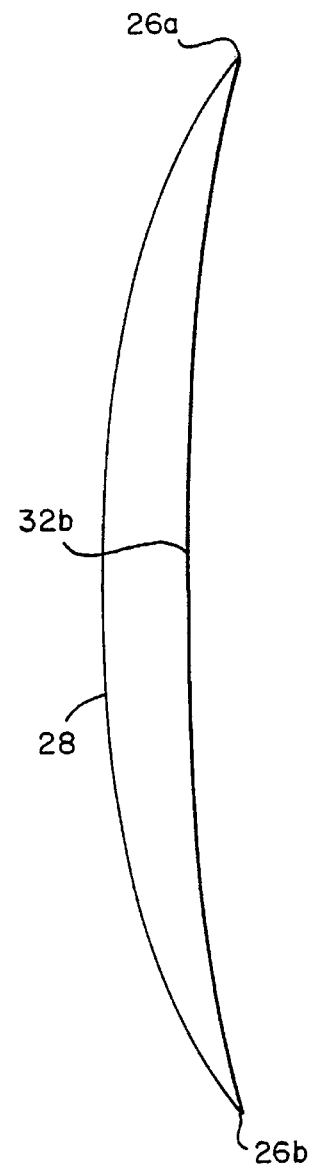
FIG. 6a is a side plan view of the diffuser of FIG. 6.

As best seen in FIG. 1, an air bag restraint system shown generally at 10 with a diffuser 12 of this invention installed near a gas inlet opening 14 of air bag cushion 16 substantially perpendicular to the flow of gas from an inflator 18 through the gas inlet opening 14. The diffuser 12 is impacted by gas generated by inflator 18 exiting canister 20. The diffuser 12, as shown in FIGS. 2 and 3, is attached near the gas inlet opening 14 inside the air bag cushion 16 to the top 22 of the air bag cushion 16 and the bottom part 24 of the air bag cushion 16 along a first pair of edges 26a and 26b (as shown in FIG. 5) of diffuser 12. The diffuser 12 may have optional apertures 28, as shown in FIG. 3, to permit the controlled flow of gas through the diffuser 12. Also, tapers 30, as shown in FIG. 6 and 6a may be added to the diffuser to increase the curvature of the diffuser. The gas impacting on the diffuser 12 is directed around a second pair of edges 32a and 32b of the diffuser 12 or through optional apertures 28 in diffuser 12.

This redirection of gas from the inflator 18 by the diffuser 12 is believed to reduce the forward momentum of the air bag cushion first portion 34.

The canister 20 for use with the diffuser 12 of this invention includes any canister known in the art for use with a passenger side air bag restraint system or air bag module known in the art for use with a driver side air bag restraint system. The diffuser 12 of this invention is shown as used with a passenger side canister 20 which includes a pair of first walls 36a and 36b (top and bottom, respectively, when viewed from above) and a pair of second walls 38a and 38b (left and right respectively when viewed from above, 38b is not shown) that define a top opening 40, as shown in FIG. 1. An air bag inflator 18 is held in the bottom 42 of canister 20 by means known in the art. A solid gas generant or a "hybrid" inflator can be used with the diffuser.

Adjacent the canister 20 and attached thereto is an air bag cushion 16 having a first portion 34 which is disposed in front of the occupant of the vehicle when the air bag cushion 16 is fully deployed. An air bag cushion second portion 44, encompassing the side, top and bottom walls, is attached to the first portion 34 and terminates in a third portion 46 defining a gas inlet opening 14 of the air bag cushion 16. The air bag cushion first portion 34 has a front surface 48 which faces the occupant during deployment of the air bag cushion 16 and a back surface 50 which faces the interior of the air bag cushion 16. The first 34 and the second portions 44 of the air bag define an enclosed volume. The air bag cushion 16 used with this invention can be any air bag cushion known in the art.

Figure 8:
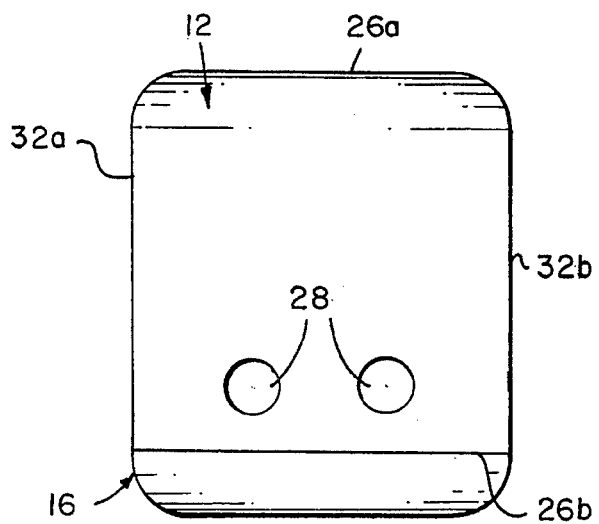
FIG. 8 is a top plan view of the diffuser illustrating the diffuser attached on all but one edge.

The diffuser 12 of this invention, as shown in FIG. 5 illustrated herein includes a panel 52, having a first pair of edges 26a and 26b (top edge and bottom edge respectively when viewed from the front) and, a second pair of edges 32a and 32b (left edge and right edge when viewed from the front). Additional edges may be used as needed depending on the design, Shape, and requirements of the air bag cushion 16 used with this invention. For example, the diffuser 12 of this invention may be circular in cross section depending on the requirements of the air bag cushion 16. Also, more than two edges of the diffuser 12 may be attached to the air bag cushion 16. However, at least one edge of the diffuser 12 as shown in FIG. 8 or a section of the circumference, in the case of a circular diffuser, must be left unattached to the inner surface of the air bag cushion second portion 34 for the diffuser 12 of the invention to function as intended.

The diffuser 12 can be attached across the gas inlet opening 14 from the top of the air bag cushion to the bottom of the cushion or from the left side of the cushion to the right side. The diffuser 12 is attached by appropriate means, such as stitching, to the inside air bag cushion second portion 44 between a point adjacent to the gas inlet opening 14 to a point about half way between the gas inlet opening 14 and the air bag cushion first portion 34. More preferably, the diffuser 12 is attached to the inside air bag cushion second portion 44 between a point adjacent to the gas inlet opening 14 to a point about one fifth of the way between the gas inlet opening 14 and the air bag cushion first portion 34. The diffuser 12 must be placed sufficiently close to the gas inlet opening 14 to cause a controlled change in the direction flow of gas from the inflator 18 such that the forward velocity of the air bag cushion first portion 34 is reduced. The diffuser 12 may be attached to the canister top opening 40 along with the air bag cushion 16. The size of the diffuser 12 should be such that it occupies from about 40% to about 90%, and preferably from about 60% to about 80% of the air bag cushion 16 cross section in the area of the cushion in which it is located.

Figure 7:
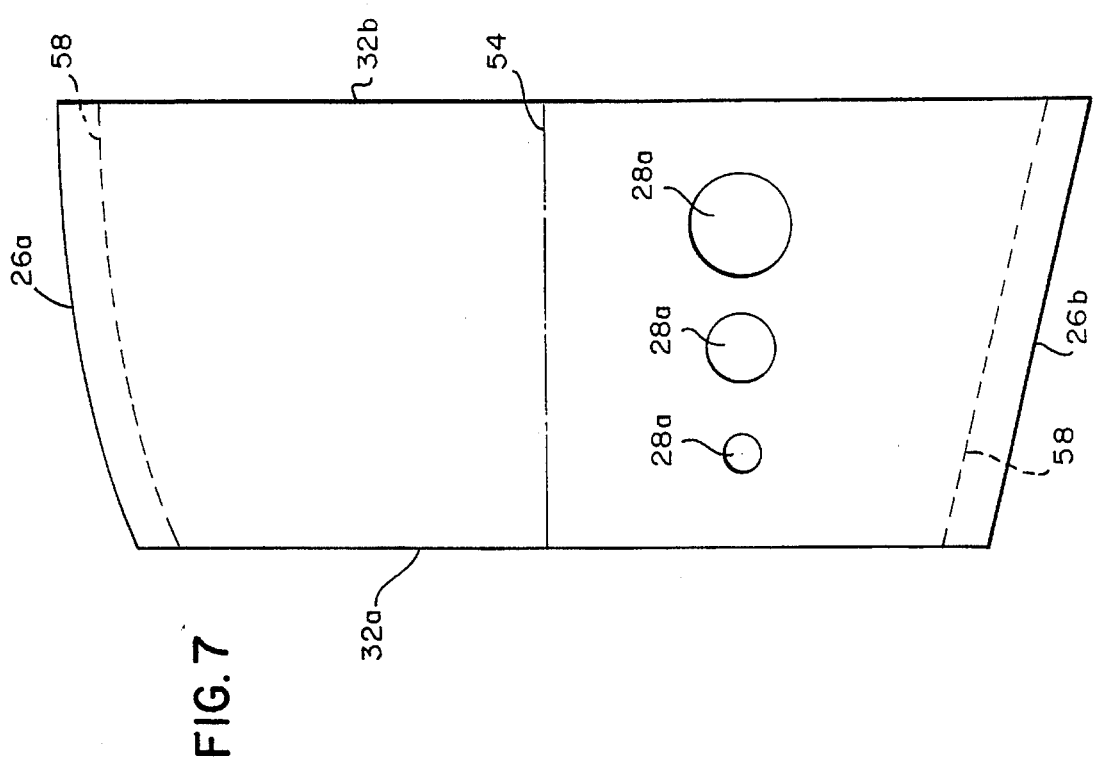
FIG. 7 is a top view of a third possible shape for the diffuser.

The diffuser 12 may contain optional apertures 28 to direct the gas impacting on the diffuser 12 in a controlled manner. Apertures 28 as shown in the preferred embodiment of this invention are located near the bottom edge 26b of the diffuser 12. Preferably, the apertures are located between the middle 54 of the diffuser 12 and the bottom edge 26b. More preferably, the apertures are located no more than one-third of the distance from the bottom edge 26b between the top edge 26a and the bottom edge 26b. Any number of apertures can be used depending on the requirements of the air bag cushion and the type of deployment sought. When apertures 28 are to be used to compensate for the nonuniform gas flow from an inflator 18 across the gas inlet opening 14, the size of the apertures 28a may be varied with the distance from one edge of the diffuser 12, as shown in FIG. 7. In this instance a larger amount of gas is produced on the left side of gas inlet opening 14, therefore smaller apertures 28a are placed near the left edge 32a of diffuser 12. The nonuniform flow of gas from the inflator 18 can also be compensated for by cutting the attached edges of the diffuser 12 at an angle, as shown in FIG. 7, thereby directing more gas to one side of the air bag cushion 16

To increase the curvature and thereby the braking action of the diffuser 12, a number of possible modifications may be made to the diffuser without departing from the spirit of the invention. For example, tapers 30, wherein a tapered section of material is removed and the adjoining material is stitched together, as shown in FIG. 6 may be added to the diffuser 12, thus forming the diffuser 12 into a "parachute" or "bowl" shape. It is believed that a diffuser 12 of this shape would be more effective at halting the forward momentum of gas entering the air bag cushion 16 through the third portion 14. Also, the attached edges, for example the top and bottom edges 26a and 26b as shown in FIG. 6, can be cut into arcs 56a and 5b and then stitched to the air bag cushion 16 along a straight line. This would produce a diffuser 12 shape, as shown in FIG. 6a.

The apertures 28 in conjunction with the diffuser 12 attached to the air bag cushion perpendicular to the flow of gas from the inflator 18 through the gas inlet opening 14 result in slowing the forward momentum of the air bag cushion first portion 34 and moving the air bag cushion second portion 44 downward such that the initial impact of the air bag cushion 16 is made with the occupant's lower torso. Further, during deployment, the diffuser 12 bows or curves so that the apertures 28 function like gas jets directing the flow of gas against the bottom part 24 of the air bag cushion second portion 44, thus filling the lower portion of the air bag cushion more rapidly.

The diffuser 12 can be made from any suitable flexible material having sufficient strength so as not to fail under the forces of the deploying air bag cushion 16. Material used in the manufacture of the air bag cushion 16 can be used in the manufacture of the diffuser. Materials suitable for use in this invention are woven or knit fabrics made from nylon, polyester, polyamide fibers, or other suitable materials. The porosity of the fabric from which the diffuser 12 is made can be varied to achieve differing degrees of stopping action of the incoming gas. Typically, a nylon 840D rip stop is used to make the diffuser Natural fibers or fibers subject to structural degradation by molds or bacteria should not be used. Further, materials not approved for use in automotive vehicle interiors should not be used. Thread used for attaching the diffuser 12 to the air bag cushion 16 can be made from any suitable fiber made of nylon, polyester, polyamide or the like.

To assemble an air bag cushion 16 with the diffuser 12 of this invention, the diffuser 12 can be stitched along stitch lines as shown in FIG. 5, onto the inside of the air bag cushion 16 prior to final assembly of the cushion. Also, the diffuser 12 can be installed in the air bag cushion 16 after the air bag cushion 16 has been assembled. The cushion in this case is drawn through the gas inlet opening 14 and the diffuser 12 is attached using an appropriate stitch, such as a lock stitch. The diffuser 12 can also be attached to the mouth of the canister 20 at the same location at which the air bag cushion 16 is attached. Reinforcements can be used to strengthen the air bag cushion where the diffuser 12 is attached. The air bag cushion 16 with the diffuser 12 of this invention is then installed in a canister or attached to a module housing by means known in the art. Also, the diffuser 12 of this invention can be used with a standard tether. The air bag restraint system with the diffuser 12 of this invention can then be installed behind the dashboard of the passenger compartment of a vehicle or in the steering wheel of a passenger vehicle.

Figure 4A:
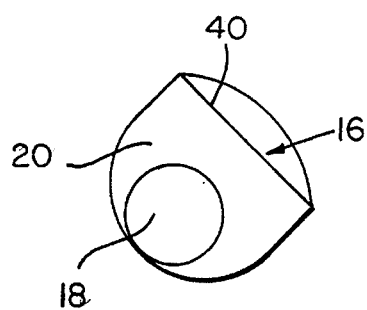
FIGS. 4a, 4b, and 4c are a series of side views illustrating the function of the diffuser during different stages of deployment of the air bag.
Figure 4B:
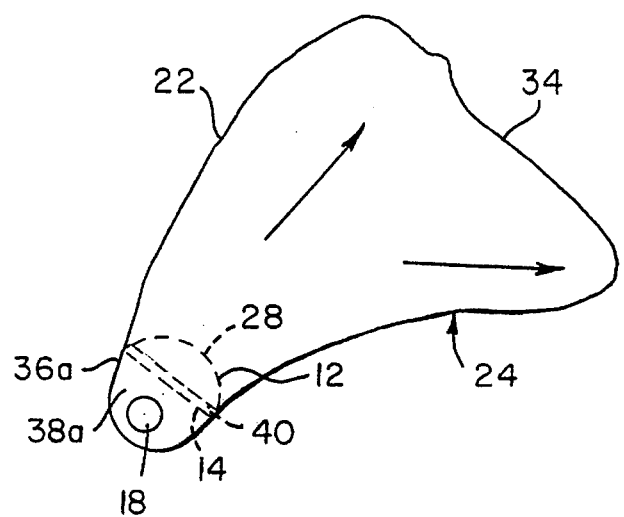
Figure 4C:
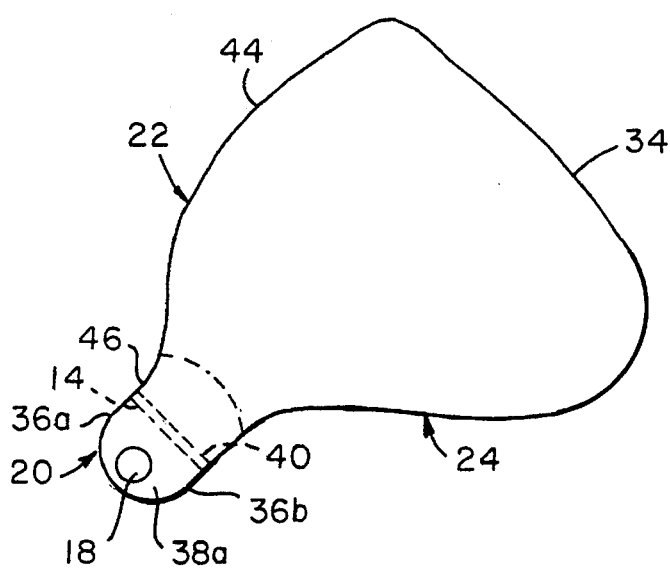

A signal from a crash sensor (not shown) triggers the generation of gas by the inflator 18. The gas flows into the air bag cushion 16 from the inflator through the gas inlet opening 14. The expanding air bag cushion 16 ruptures the tearseam of the module cover or opens the hinged cover and starts to deploy into the vehicle passenger compartment, as shown in FIG. 4a. The gas generated by the inflator impacts on the diffuser 12 of this invention, and the forward momentum of the gas is slowed momentarily while gas is directed around the diffuser 12 and through the optional apertures. As the forward momentum of the gas is reduced momentarily, likewise, the forward momentum of the air bag cushion first portion 34 is also reduced. It is believed that the diffuser 12 reduces the impact loading on the air bag cushion 16, thereby increasing the structural margin of the cushion. Also, as particulate matter present in the gas stream impacts on the diffuser 12, the particulate matter becomes trapped in the fabric of the diffuser 12 or, due to reduced momentum, the particulate matter drops out of the gas stream and falls harmlessly into the air bag cushion 16. When the optional apertures are used, the forward deployment of the air bag cushion 16 is restricted and then proceeds at a slower rate, while the bottom portion 24 of the air bag cushion 16 deploys more quickly due to the preferential direction of gas by the apertures, as shown in FIG. 4b. The deployment process continues until the air bag cushion 16 is fully deployed, as shown in FIG. 4c.

Although this invention is shown for use with a passenger side air bag cushion, the diffuser of this invention will function just as well when used in conjunction with a driver side air bag cushion.

Thus, in accordance with the invention, there has been provided a means for slowing the forward momentum of the air bag cushion, thus permitting the bottom portion of the air bag to inflate into place between the occupant's torso and the steering wheel or the instrument panel during deployment of the air bag cushion. Also provided is a means for deploying the air bag cushion such that the initial contact is made between the air bag cushion and the occupant's torso. A means has also been provided for reducing the forward thrust of gas entering the air bag cushion. There has also been provided a means for secondary filtration to reduce the amount of particulate matter present in the gas which inflates the air bag cushion. Additionally, there has been provided a means for controlling the deployment angle of air bag cushion.

With this detailed description of the invention, those skilled in the art will appreciate that modification may be made to the invention without departing from the spirit thereof. Therefore, it is not intended that the scope of the invention be limited to the specific embodiments that have been illustrated and described. Rather, it is intended that the scope of the invention be determined by the scope of the appended claims.

We claim:

1. A device for use with an automotive air bag cushion for use in the passenger compartment of a vehicle, with an air bag cushion having a first portion, which is disposed opposite an occupant of the vehicle when the air bag cushion is fully deployed, said first portion having a front surface and a back surface;

a second portion attached to said first portion having a plurality of oppositely facing pairs of side walls defining a top portion, a right portion and a left portion;

said side walls terminating in a third portion located opposite said first portion defining a gas inlet opening for receiving a flow of gas from an inflator, wherein said first and said second portions of said air bag cushion define an interior volume;

the improvement comprising, a diffuser attached to the inside of said second portion of said air bag cushion at a plurality of points, spanning across said second portion and defining a plane of attachment;

said diffuser having a first pair of opposite edges and a second pair of opposite edges, wherein said first pair of opposite edges of said diffuser are attached to said top and bottom portions of said second portion over the entire length of said first pair of opposite edges between a point adjacent said third portion and a point about half way between said third portion and said first portion, at least one of said edges being left unattached to said inside of said air bag cushion, wherein said plane of attachment of said diffuser is such that said diffuser is displaced substantially perpendicular to the flow of gas from the inflator through said third portion and is sufficiently close to said third portion to cause a controlled change in the flow of gas from the inflator such that the forward momentum of the flow of gas is reduced which in turn reduces the momentum of said first portion wherein a plurality of apertures located near said bottom portion of said air bag cushion extend through said diffuser the size of said apertures varies with the distance from one of said second pair of edges.

2. The device of claim 1 wherein said diffuser attached to said second portion of said air bag cushion wherein only one edge is not attached to said air bag cushion second portion.

3. A device for use with an automotive air bag cushion for use in the passenger compartment of a vehicle, with said air bag cushion having a first portion, which is disposed opposite an occupant of the vehicle when the air bag cushion is fully deployed, said first portion having a front surface and a back surface;

a second portion attached to said first portion, said having a plurality of oppositely facing pairs of side walls defining a top portion, a bottom portion, a right portion and a left portion;

said side walls terminating in a third portion located opposite said first portion defining a gas inlet opening for receiving a flow of gas from an inflator, wherein said first and said second portions of said air bag cushion define an interior volume;

The improvement comprising, a diffuser attached to the inside of said second portion of said air bag cushion at a plurality of points, spanning across said third portion and defining a plane of attachment;

said diffuser having a first pair of opposite edges and a second pair of opposite edges, wherein said first pair of opposite edges of said diffuser are attached at an angle to said top and bottom portions of said second portion over the entire length of said first pair of opposite edges between a point adjacent said third portion and a point about half way between said third portion and said first portion, at least one of said edges being left unattached to said inside of said air bag cushion, wherein said plane of attachment of said diffuser is such that said diffuser is displaced substantially perpendicular to the flow of gas from the inflator through said third portion and is sufficiently close to said third portion to cause a controlled change in the flow of gas from the inflator such that the forward momentum of the flow of gas is reduced which in turn reduces the momentum of said first portion wherein said first pair of opposite edges of said diffuser are attached to said second portion at an angle in order to direct a greater amount of the flow of gas to one side of the air bag cushion, said diffuser having a plurality of apertures, the size of which vary with the distance from one of said second pair of edges, located near said bottom portion of said air bag cushion.

4. An inflatable occupant restraint device for a motor vehicle comprising;

a canister formed a pair of first walls and a pair of second walls that define bottom and mouth portions having an air bag inflator held in said bottom portion thereof, said mouth portion defining a gas outlet opening;

an air bag cushion attached to said mouth portion of said canister;

said air bag cushion having a first portion, which is disposed opposite an occupant of the vehicle when said air bag cushion is fully deployed, said first portion having a front surface and a back surface, a second portion attached to said first portion, said second portion having a plurality of oppositely facing pairs of side walls defining a top portion, a bottom portion, a right portion and a left portion; said walls terminating in a third portion located opposite said first portion defining a gas inlet opening for receiving a flow of gas from said inflator; wherein said first and second portion of said bag cushion define an interior volume;

a diffuser attached to the inside of said second portion of said air bag cushion at a plurality of points, spanning across said second portion and defining a plane of attachment; said diffuser having a first pair of opposite edges and a second pair of opposite edges, wherein said first pair of opposite edges of said diffuser are attached to said top and bottom portions of said second portion over the entire length of said first pair of opposite edges between a point adjacent said third portion and a point about half way between said third portion and said first portion, at least one of said edges being left unattached to said inside of said air bag cushion, wherein said plane of attachment of said diffuser is such that said diffuser is displaced substantially perpendicular to the flow of gas from the inflator through said third portion and is sufficiently close to said third portion to cause a controlled change in the flow of gas from the inflator such that the forward momentum of the flow of gas is reduced which in turn reduces the momentum of said fist portion, wherein a plurality of apertures extend through said diffuser the size of said apertures varies with the distance from one of said second pair of edges.

5. The inflatable occupant restraint device of claim 4 wherein said diffuser is located adjacent the mouth portion of said canister.

6. The inflatable occupant restraint device of claim 5 wherein said diffuser is attached to said mouth portion of said canister at the same location at which said air bag cushion is attached.

7. The device of claim 4 wherein said diffuser is attached to said second portion of said air bag so that only one of said opposite edges is unattached to said air bag cushion second portion.

* * * * *

UNITED STATES PATENT AND TRADEMARK OFFICE
CERTIFICATE OF CORRECTION

PATENT NO. : 5,494,314
DATED : February 27, 1996
INVENTOR(S) : Kriska et al.

It is certified that error appears in the above-indentified patent and that said Letters Patent is hereby corrected as shown below:

```
Col. 1, Ln. 16, after "includes" delete ";" (semi-colon).
Col. 6, Ln.  8, after "diffuser" insert -- 12. --.
Col. 6, Ln. 17, after "lines" insert -- 58, --.
Col. 6, Ln. 26, after "cushion" insert -- 16 --.
Col. 7, Ln. 23, change "an" to -- said --.
Col. 7, Ln. 28, between "said first portion" and "having"
                insert -- , said second portion --.
Col. 7, Ln. 30, after "top portion," insert
                -- a bottom portion, --.
Col. 8, Ln.  5, before "having" insert -- second portion --.
Col. 8, Ln. 64, before "bag cushion" insert -- air --.
```

Signed and Sealed this

Twenty-fourth Day of December, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,494,314
DATED : February 27, 1996
INVENTOR(S) : Kriska et al.

It is certified that error appears in the above-indentified patent and that said Letters Patent is hereby corrected as shown below:

Col. 10, Ln. 1, change "fist" to -- first --.

Signed and Sealed this

Fourth Day of February, 1997

Attest:

BRUCE LEHMAN

Attesting Officer          Commissioner of Patents and Trademarks

UNITED STATES PATENT AND TRADEMARK OFFICE
CERTIFICATE OF CORRECTION

| | | |
|---|---|---|
| PATENT NO. | : 5,494,314 | Page 1 of 1 |
| APPLICATION NO. | : 08/361022 | |
| DATED | : February 17, 1996 | |
| INVENTOR(S) | : Kriska et al. | |

It is certified that error appears in the above-identified patent and that said Letters Patent is hereby corrected as shown below:

Col. 10, Ln. 1, change "fist" to -- first --.

Signed and Sealed this

Second Day of October, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 5,494,314 |
| APPLICATION NO. | : 08/361022 |
| DATED | : February 27, 1996 |
| INVENTOR(S) | : Kriska et al. |

It is certified that error appears in the above-identified patent and that said Letters Patent is hereby corrected as shown below:

Col. 10, Ln. 1, change "fist" to -- first --.

This certificate supersedes Certificate of Correction issued October 2, 2007.

Signed and Sealed this

Twenty-seventh Day of November, 2007

JON W. DUDAS
*Director of the United States Patent and Trademark Office*